US010322683B2

(12) United States Patent
Lawrence et al.

(10) Patent No.: US 10,322,683 B2
(45) Date of Patent: Jun. 18, 2019

(54) MOTORIZED VEHICLE WITH A TOOL HOLDING APPARATUS

(71) Applicants: Todd David Lawrence, Myerstown, PA (US); Brandon Todd Lawrence, Myerstown, PA (US); Austin David Lawrence, Myerstown, PA (US); Colton David Lawrence, Myerstown, PA (US)

(72) Inventors: Todd David Lawrence, Myerstown, PA (US); Brandon Todd Lawrence, Myerstown, PA (US); Austin David Lawrence, Myerstown, PA (US); Colton David Lawrence, Myerstown, PA (US)

( * ) Notice: Subject to any disclaimer, the term of this patent is extended or adjusted under 35 U.S.C. 154(b) by 0 days.

(21) Appl. No.: 15/695,054

(22) Filed: Sep. 5, 2017

(65) Prior Publication Data
US 2018/0345876 A1 Dec. 6, 2018

Related U.S. Application Data

(60) Provisional application No. 62/406,493, filed on Oct. 11, 2016.

(51) Int. Cl.
*B60R 11/06* (2006.01)
*A01D 75/00* (2006.01)
(Continued)

(52) U.S. Cl.
CPC ............ *B60R 11/06* (2013.01); *A01D 75/008* (2013.01); *B60R 21/13* (2013.01); *B60R 2021/0018* (2013.01)

(58) Field of Classification Search
CPC . B60R 11/06; B60R 9/048; B60R 2011/0059; B60R 2011/0071;
(Continued)

(56) References Cited

U.S. PATENT DOCUMENTS 1,987,842 A * 1/1935 Sampson ............... A01K 97/10
248/514
2,416,828 A * 3/1947 Hamre ................... A01K 97/10
248/515
(Continued)

FOREIGN PATENT DOCUMENTS

| GB | 2133977 A | 8/1984 |
| GB | 2363711 B | 1/2002 |
| GB | 2468135 A | 9/2010 |

OTHER PUBLICATIONS

International Search Report, PCT/US18/48552, dated Dec. 18, 2018, Form PCT/ISA/210, 17 pages.
(Continued)

*Primary Examiner* — Scott T McNurlen
(74) *Attorney, Agent, or Firm* — Hooker & Habib, P.C.

(57) ABSTRACT

A tool holder apparatus for a motorized vehicle for residential use includes an attachment member, a rotary table attached to the attachment member, the table having fixed and relatively movable table members, and a tool holder attached to the movable table member. The attachment member removably fastens the tool holder apparatus to a member of the motorized vehicle.

33 Claims, 10 Drawing Sheets

(51) Int. Cl.
  *B60R 21/00* (2006.01)
  *B60R 21/13* (2006.01)
(58) Field of Classification Search
  CPC ............ B60R 2011/0085; B60R 21/13; B60R 2021/0018; A01K 97/10; A01D 75/008
  USPC ....... 224/410, 401, 405, 282, 534, 537, 553, 224/568, 571; 248/540–541, 512–513, 248/521
  See application file for complete search history.

(56) References Cited

U.S. PATENT DOCUMENTS

| | | | | |
|---|---|---|---|---|
| 3,385,544 | A * | 5/1968 | Barnett | .................. A01K 97/10 248/513 |
| 3,759,538 | A | 9/1973 | Fabiano | |
| 4,901,970 | A * | 2/1990 | Moss | ...................... A01K 97/10 224/282 |
| 5,779,272 | A * | 7/1998 | Panek | .................. B60R 21/131 280/756 |
| 6,516,986 | B1 | 2/2003 | Lassanske et al. | |
| 7,168,714 | B2 | 1/2007 | Gibbs | |
| 2012/0000955 | A1 * | 1/2012 | King | ....................... B60R 11/06 224/545 |
| 2012/0091178 | A1 * | 4/2012 | Hancock | .................. B60R 9/06 224/401 |

OTHER PUBLICATIONS

"Andoer Camera Handlebar Seatpost Clamp Roll Bar Mount+ Mounting Adapter rotate 360 degrees diameters of between 1.5cm and 4cm for GoPro Hero 1 2 3 3+" (Amazon) Dec. 5, 2013 (Dec. 5, 2013) URL https://www.amazon.com/Camera-Handlebar-Seatpost-Mounting-Adapter/dp/B00HJ0AYRI, especially Caption para 1-5, Product Description—Features, "Clamp Roll Bar Mount+Mounting Adapter" and Inset Figures 1-4, 2 pages.

"Bike Phone Mount Holder, Universal Large Phone Rack for Bicycle Motorcycle Handlebars, Adjustable 360 rotation, Fits iPhone 7 | 7 Plus, iPhone 6s| 6s Plus, Galaxy S7, S6, S5, Nexus up to 3.8" wide" (Amazon) URL https://www.amazon.com/Universal-Motorcycle-Handlebars-Adjustable-Rotation/dp/B073S5DFGP, especially Inset Figures 1-6, 4 pages.

"DIY Axe Shovel Mount" (JRNOTTARTS) Jan. 31, 2016 (Jan. 31, 2016); retrieved from Internet Nov. 14, 2016; URL https://www.fjcruiserforums.com/forums/4x4-off-road-tech/518338-diy-axe-shovel-mount.html, 3 pages.

* cited by examiner

MOTORIZED VEHICLE WITH A TOOL HOLDING APPARATUS

CROSS REFERENCE TO RELATED APPLICATIONS

This application claims the benefit of pending U.S. Provisional Patent Application No. 62/406,493 filed on 11 Oct. 2016 titled "Riding Lawnmower Accessory System", which priority provisional patent application is incorporated by reference in its entirety as if fully set forth herein.

FIELD OF THE DISCLOSURE

The present disclosure relates to motorized vehicles for residential use such as small tractors, lawn and garden vehicles, riding lawnmowers, and the like, and in particular to a tool holder apparatus for holding yard and garden tools attachable to such motorized vehicles.

BACKGROUND OF THE DISCLOSURE

Motorized vehicles for residential use include small tractors, lawn and garden vehicles, riding lawnmowers, and the like. Such vehicles have an operator's seat attached to a frame, and often include a rollover protection system (ROPS) also attached to the frame. The ROPS may include a rollover cage or a pair of upright members attached to the frame on opposite sides of the seat, and a cross bar connecting the upright members above the seat. The ROPS is designed to reduce the risk of injury to the operator in the event of a vehicle roll over.

Figure 19:
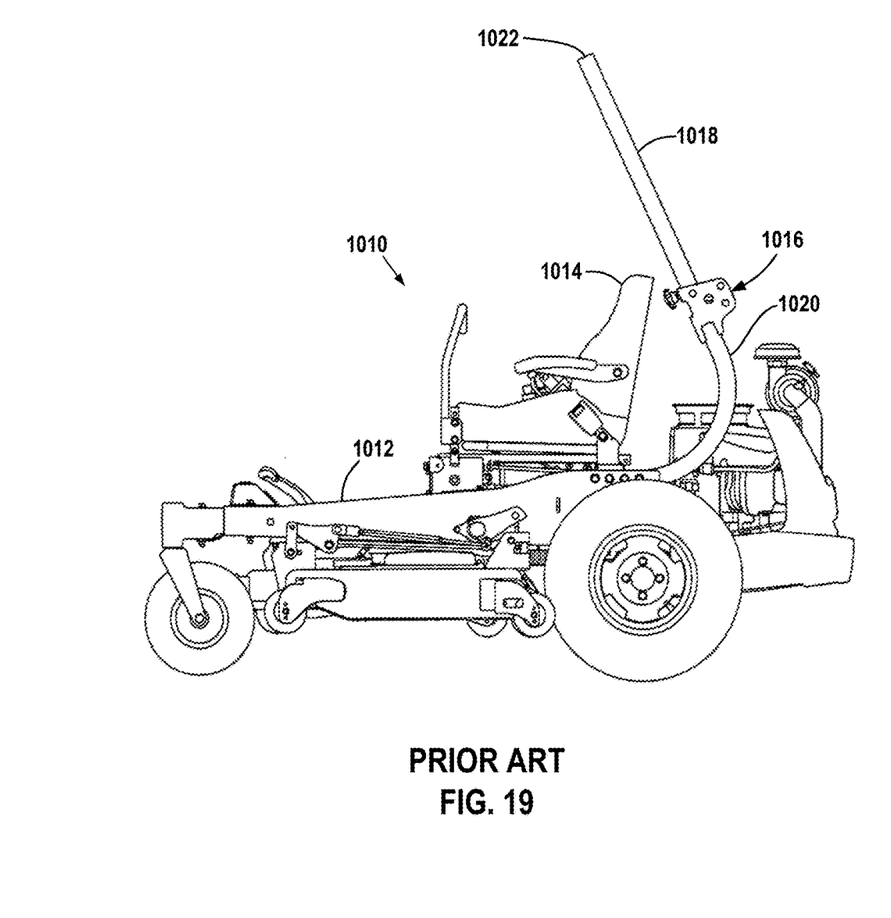
FIG. 19 is a side view of a prior art motorized vehicle having a ROPS structure.

FIG. 19 illustrates a conventional lawn and garden tractor 1010 configured as a riding lawnmower that is disclosed in David, U.S. Pat. No. 7,971,984. The tractor has a frame 1012, an operator's seat 1014 mounted on the frame, and a ROPS 1016. The illustrated ROPS is formed from elongate structural members and includes a pair of upright members 1018 foldably attached to lower members 1020 attached to the frame. The upright members 1018 are located on opposite sides of the seat and are joined by a cross bar 1022. The ROPS members may be formed from tubular steel having a prismatic or curved cross section outer perimeter.

The ROPS 1016 is illustrated in its normal operating state with the upright members 1018 in their raised positions. The members 1018 can be folded in a clockwise direction as viewed in the figure to place the ROPS in a lowered, standby operating state for storage or the like.

Motorized vehicles for residential use are used to perform a variety of tasks, including lawn and garden maintenance, snow removal, grading, and the like. It would be desirable to have a tool holder apparatus that enables the vehicle operator to carry portable tools or other items on the vehicle so that the tools or items are on hand when the vehicle reaches a work site. By "tools" it is meant the tools, implements, and goods normally used for lawn and garden maintenance, snow removal, and other home, lawn, and garden tasks. It would be also desirable that the tool holder apparatus not prevent the ROPS from moving between its operating state and its standby state.

SUMMARY OF THE DISCLOSURE

Disclosed is a motorized vehicle for residential use having a ROPS and a tool holder apparatus that attaches to the ROPS. The tool holder apparatus enables the vehicle operator to conveniently transport portable tools to a work site using the vehicle without affecting the operator's ability to operate the vehicle from the operator's seat. The tool holder apparatus can remain attached to the ROPS even when the ROPS is transitioning between an operating state and a standby state.

The tool holder apparatus includes an attachment member that receives a ROPS member, a rotary table attached to the attachment member, the rotary table having a first member fixedly attached to the attachment member and a second member rotatably attached to the first member for relative rotation about an axis of rotation, and a tool holder attached to the second member of the rotary table for conjoint rotation with the second member, the tool holder being configured to hold a tool or a portion of a tool for transport.

The attachment member is preferably designed to enable the tool holder apparatus to be removably fastened to the vehicle. The attachment member in embodiments may include components relatively movable between opened and closed positions to receive the ROPS member and then close on the ROPS member. The attachment member components may be connected together by a hinge for movement between opened and closed positions, or may be entirely separable from one another.

In other possible embodiments the attachment member may be configured to attach the tool holder apparatus to some other member of the motorized vehicle other than a ROPS. The motorized vehicle may include, for example a member dedicated to holding the tool holder apparatus.

The tool holder in possible embodiments may include one or more apertures being configured to hold one or more tools. An aperture may be configured to receive a handle of a tool. Multiple apertures may be arranged to cooperatively receive respective handle portions of a long handled tool such as a snow or garden shovel, leaf rake, or the like.

The tool holder may be made of separate members, each member having an aperture extending along a first axis, the apertures co-axial with each other to cooperatively hold the handle of a long-handled tool.

The tool holder members may each include an additional aperture extending along a second axis not coaxial with the first axis, the additional apertures co-axial with each other to cooperatively hold the handle of a long-handled tool. The first and second axes may be offset from one another in the direction of the axis of rotation of the rotary table to provide additional clearance between the pair of tools held by the apertures.

In alternative embodiments the tool holder may have a first member that includes a first set of apertures, each aperture extending along an axis. The aperture axes are parallel with one another but not co-axial with one another so that each aperture can hold a different tool or a portion of that different tool.

The tool holder may include an additional member having a corresponding set of apertures that are coaxial with the corresponding apertures of the first member to permit each different tool to be held in multiple apertures.

In yet other embodiments the tool holder may include a container defining an interior volume that can hold tools or other objects. In yet other embodiments the tool holder may be configured to hold a specific tool or item such as a garden hose, pruning shears, or the like.

Other objects and features of the disclosure will become apparent as the description proceeds, especially when taken in conjunction with the accompanying drawing sheets illustrating one or more illustrative embodiments.

DETAILED DESCRIPTION

Figure 1:
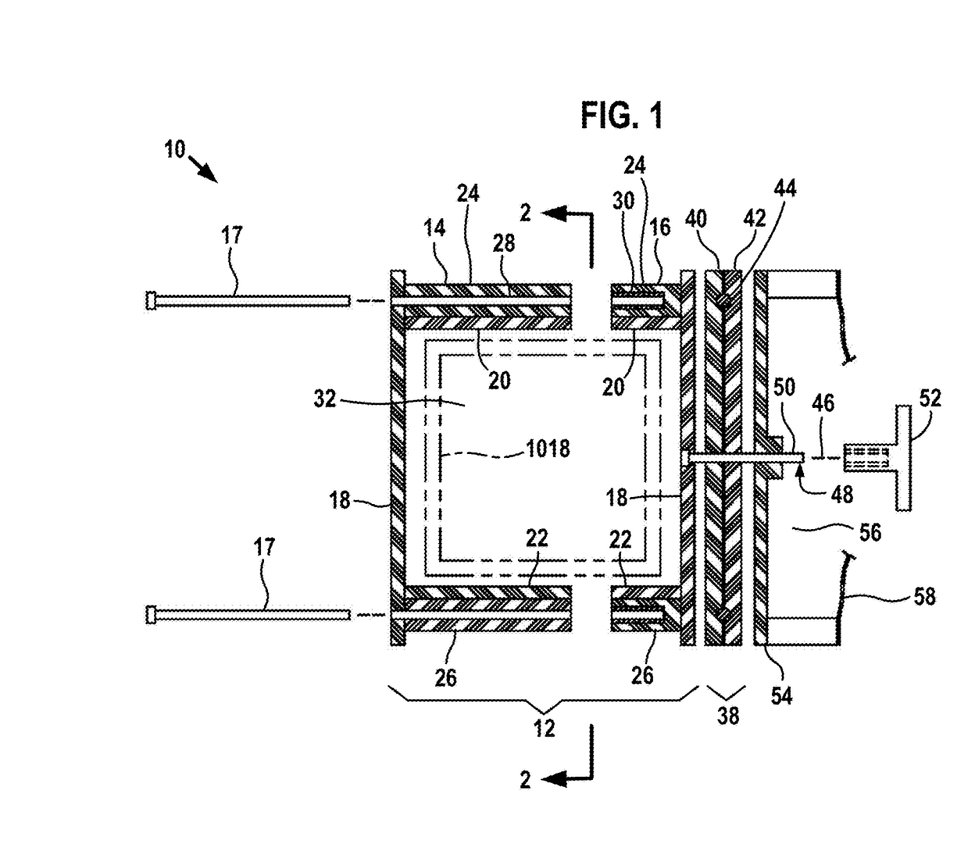
FIG. 1 is an exploded, vertical sectional view of a first embodiment tool holder apparatus attached to a ROPS member of a motorized vehicle in accordance with this disclosure.
Figure 2:
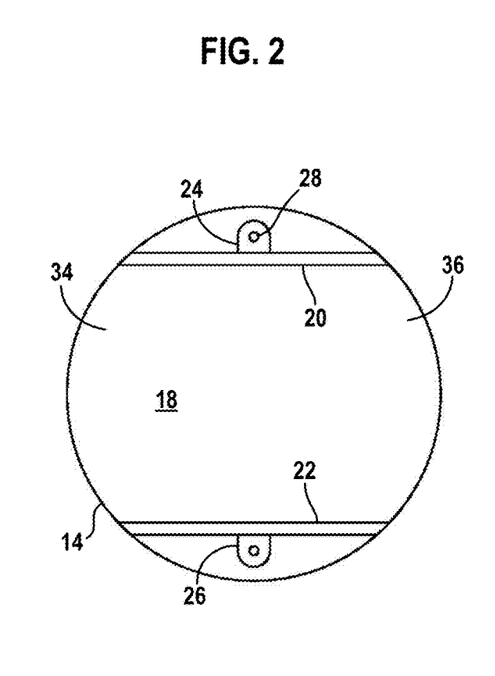
FIG. 2 is a view taken along line 2-2 of FIG. 1.
Figure 3:
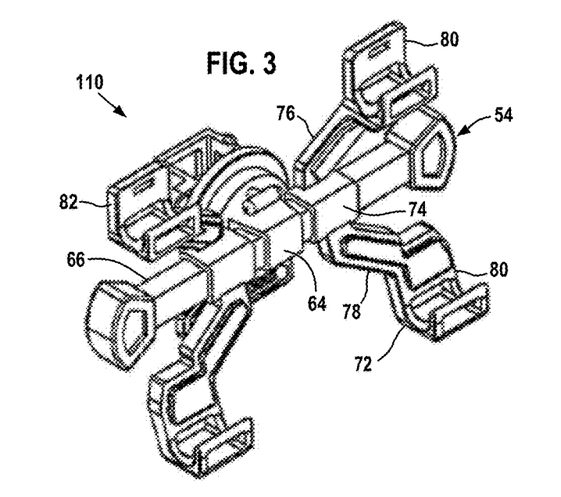
FIGS. 3-6 are perspective, front, top, and side views of a second embodiment tool holder apparatus, the second embodiment tool holder apparatus including a second embodiment tool holder.
Figure 4:
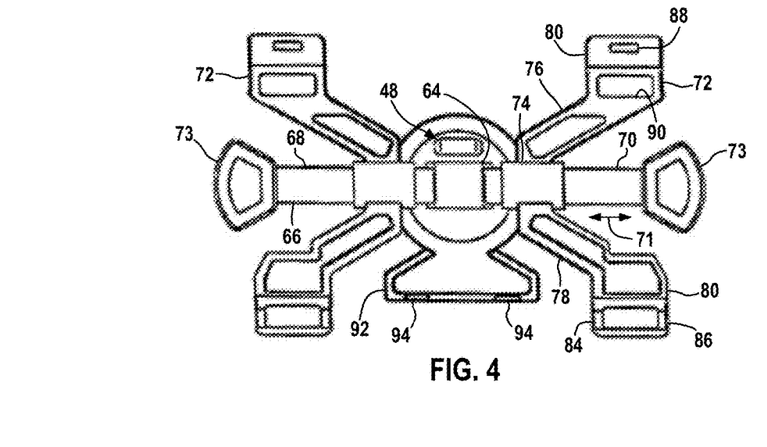

FIGS. 1 and 2 illustrate a first embodiment tool holder apparatus 10 in accordance with this disclosure. The tool holder apparatus 10 is shown attached to one of the upright members 1018 (shown in phantom lines in FIG. 1) of the motorized vehicle 1010.

The tool holder apparatus 10 includes an attachment member 12 located on one end that receives the ROPS upright member 1018 and removably attaches the tool holding apparatus 10 to the upright member. The attachment member 12 may be formed from nylon or other suitable material. The attachment member includes an outer attachment body half 14 and an inner attachment body half 16 that are releasably fastenable to one another by a set of threaded fasteners 17.

The attachment member halves 14, 16 each include an end plate 18 and a pair of spaced apart inner side walls 20, 22 extending away from an inner side of the end plate. Adjacent to and extending along the outer sides of the side walls 20, 22 are lugs 24, 26 that have holes 28 to receive the threaded fasteners 17. The holes in the outer attachment half 14 are formed as through holes. The holes in the inner attachment half 16 carry threaded inserts 30 that engage the threaded fasteners 17.

When the ROPS upright member is sandwiched between the end plates 18 of the attachment halves 14, 16 as shown in FIG. 1, the end plates and the side walls 20, 22 of the attachment halves define a chamber 32 having opposite open ends 34, 36. In the illustrated embodiment the ROPS upright member 1018 has an essentially square cross-section. The end plates and side walls have flat sides so that the chamber 32 closely conforms to the shape of the ROPS upright member. In other embodiments the end plates and side walls may be curved to conform to ROPS members having curved or otherwise different cross sections.

The chamber 32 receives the ROPS member 1018, with the ROPS member extending through the open ends 34, 36 of the chamber. The end plates 18 and the side walls 20, 22 form a non-rotatable connection with the ROPS upright member. The fasteners 18 press the attachment halves 14, 16 tightly against the ROPS upright member so that friction resists displacement of the attachment member along the ROPS member and effectively locks the attachment member in place on the ROPS member.

Friction generated by the attachment member can also resist translation and rotation of an attachment member attached to a ROPS member having a circular cross section.

The tool holder apparatus 10 additionally includes a rotary table 38 attached to the attachment member 12. The rotary table includes an inner or first table member 40 and an outer or second table member 42. The inner table member 40 is fixedly attached to the inner attachment half 16. The outer table member 42 is rotatably attached to the inner table member 40 by a "lazy Susan" bearing arrangement having roller bearings 44 spaced around a centered axis of rotation 46. The outer table member 42 rotates freely about the axis in either direction with respect to the inner table member 40, that is, the outer table member 42 can rotate with respect to the inner table member 40 more than 360 degrees in either direction about the axis 46.

The tool holder apparatus 10 includes a friction brake 48 that selectively fixes or releases the outer table member 42 to or from the inner table member 40. In the illustrated embodiment the brake 48 includes an elongate bolt 50 and cooperating threaded handle 52. The bolt 50 extends along the axis 46 and away from the outer table 42. The handle 52 is threaded onto the exposed end of the bolt 50 to press the outer table member 42 against the inner table member 40 for frictional engagement of the members that resists relative rotation between the members.

The tool holder apparatus further includes a tool holder 54 located on the end of the tool holder apparatus 10 opposite from the attachment member 12. The tool holder 54 holds or grasps an entire tool or a portion of a tool to removably attach the tool to the tool holder apparatus 10.

The tool holder 54 is attached to the outer table member 42 for conjoint rotation with the outer table member 42 with respect to the inner table member 40. The tool holder 54 shown in FIG. 1 is intended to be removable by a user from the outer table member 42 so that different tool holders can be attached to the outer table member 42 depending on the needs of the user. The tool holder 54 is attached to the outer table member 42 by the bolt 50 extending through the tool holder 42 and being tightened against the outer table member 42 by the threaded handle 52.

In other possible embodiments of the tool holder apparatus 10 the tool holder 54 is removably attached to the outer table member 42 independently of the brake by screws or other fasteners known in the mechanical arts requiring tools, or is removably attached to the outer table member 42 by tool-less fastener structures known in the mechanical arts, including by post/keyhole fasteners, interference fits, tab and slot arrangements, and the like. In yet other possible embodiments of the tool holder apparatus the tool holder 54 may be permanently fastened to the outer table member 42.

The tool holder 54 shown in FIG. 1 is a representational view of a tool holder having an aperture or opening 56 that receives the tool or a portion of the tool to be held by the tool holding apparatus. As described in more detail below, the aperture 56 may in embodiments be formed as a depression, groove, or defined by a "U" or "C" shaped member having axially opposite open ends that receives, for example, a handle portion of a long-handled tool such as a shovel or rake. The aperture 56 in other embodiments may be formed as a closed bore having an open end, may be formed as a through-slot having an open end and a closed end, or may be defined by the perimeter of a frame or a tubular member that surrounds the opening.

The tool holder 54 may also include a movable or flexible strap, cover, flap, or retainer 58 that closes the aperture during use to prevent the tool held in the aperture from falling out of the aperture during transport by the motorized vehicle.

FIGS. 3-6 illustrate a second embodiment tool holder apparatus 110 also designed for attachment to the ROPS upright member 1018. Components corresponding to the components of the first embodiment tool holder apparatus 10 are numbered with identical reference numbers.

Figure 5:
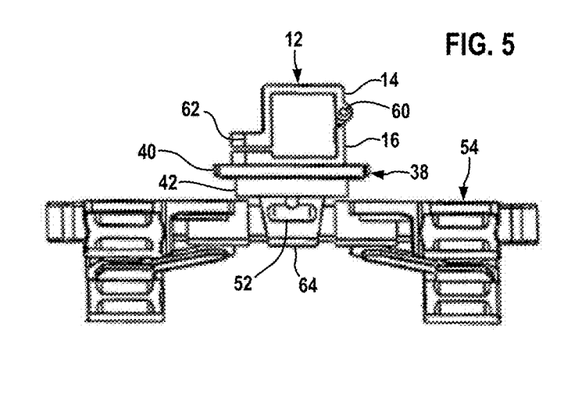

The attachment member 12 has two attachment halves 14, 16 hinged together and pivotable towards or away from each other about a hinge pin 60 that is perpendicular to the drawing sheet as viewed in FIG. 5. The attachment halves are fastened together by a threaded fastener (not shown) that is inserted into a partially threaded bore 62 cooperatively defined by the attachment halves.

FIG. 5 shows the attachment member in a closed position in preparation for fastening together by the fastener.

The brake 48 is located radially off-center of the axis of rotation of the rotary table 38. The brake handle 52 is connected to a press member (not shown) that controls frictional engagement of the rotary table members for selective locking or unlocking of the rotary table.

The holder 54 includes a base 64 centered on the outer table member 42 of the rotary table 38. The base 64 holds an elongate shaft 66 centered on the base and with opposite shaft portions 68, 70 extending away from opposite sides of the base. Like holder members 72 are mounted onto the respective shaft portions 68, 70. The holder members can slide axially along the respective shaft portions as indicated by the double-ended arrow 71.

Stops 73 attached to the ends of the shaft 66 prevent the holder members 72 from sliding off the shaft. The stops 73 frictionally engage the shaft 66. The stops 73 are removable from the shaft without damage to enable the holder members 72 to be slid off the shaft and one or more of the holder members 72 to enable replacement of the holder members 72 or to enable the holder members to be replaced by holder members of a different design.

Each holder member 72 has a tubular sleeve 74 that slideably mounts the holder member onto the shaft, an upper arm 76 extending from one side of the sleeve, a lower arm 78 extending from the other side of the sleeve, and tool retainers 80 mounted on the ends of the arms. The arms 76, 78 also extend away from a common side of the sleeve towards the free end of the shaft portion 68 or shaft portion 70 holding the holder member. The arms of each holder member also extend away from the other holder member.

Each tool retainer 80 is a "C"-shaped member extending axially between axially opposite opposed ends 84, 86. In this embodiment the tool retainer 80 is intended to receive a portion of the handle of a long-handled tool. The tool retainer defines the aperture 56 that receives the shaft portion into the retainer 80. Facing slots 88, 90 formed in respective legs of the tool retainer 80 enable a strap or bungee cord (not shown) to be attached to the tool retainer.

Figure 6:
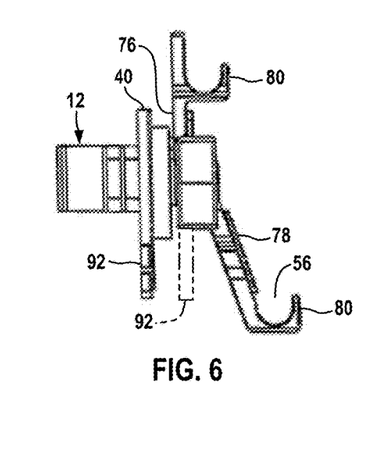

The upper arms 76 of the holder members 72 hold the tool retainers 80 attached to those arms coaxially aligned with one another. The lower arms 78 of the holder members hold the tool retainers attached to those arms coaxially aligned with one another. As best seen in FIG. 6, the lower arms 78 position the tool retainers attached to those arms axially offset from the tool retainers attached to the upper arms a distance along the rotational axis away from the rotary table 38.

The holder members 72 are individually movable along the respective shaft portions 68, 70. A user can selectively vary the distance between the aligned pairs of upper and lower tool retainers 80 in response to changes in tool handle length. The arms extend away from the other holder to maximize the maximum distance the pairs of tool retainers 80 can be spaced apart from one another.

The sleeve 74 of the holder member 72 carries a set screw (not shown) having an enlarged head for hand tightening engageable with the shaft 66 to releasably fix the holder member to the shaft. The shaft in other embodiments can include a central through slot extending along the length of the shaft that receives a threaded fastener that extends through the sleeve 74 and enables the sleeve to be pressed against the shaft for fixing the holder member.

The base 64 may also hold a setscrew or the like that holds the shaft 66 in the base 64. The setscrew can be loosed to permit axial adjustment of the shaft 66 in the base.

In this embodiment the fixed inner table member 40 of the rotary table 38 includes an extension plate 92 extending away from one side of the table member. Disposed along an outer edge of the extension plate is a pair of through slots 94. The slots 94 allow clips to be attached to the extension plate that can carry tools or other accessories. Because the extension plate is attached to the fixed table member, the orientation of the extension plate (and items attached to it) does not change with relative rotation of the outer table member 42 and the tool holder 54.

In other possible embodiments the extension plate 92 can be formed with and extend from the tool holder base 64 as shown in phantom lines in FIG. 6. In such embodiments the extension plate (and items attached to it) rotate with the tool holder 54.

Figure 7:
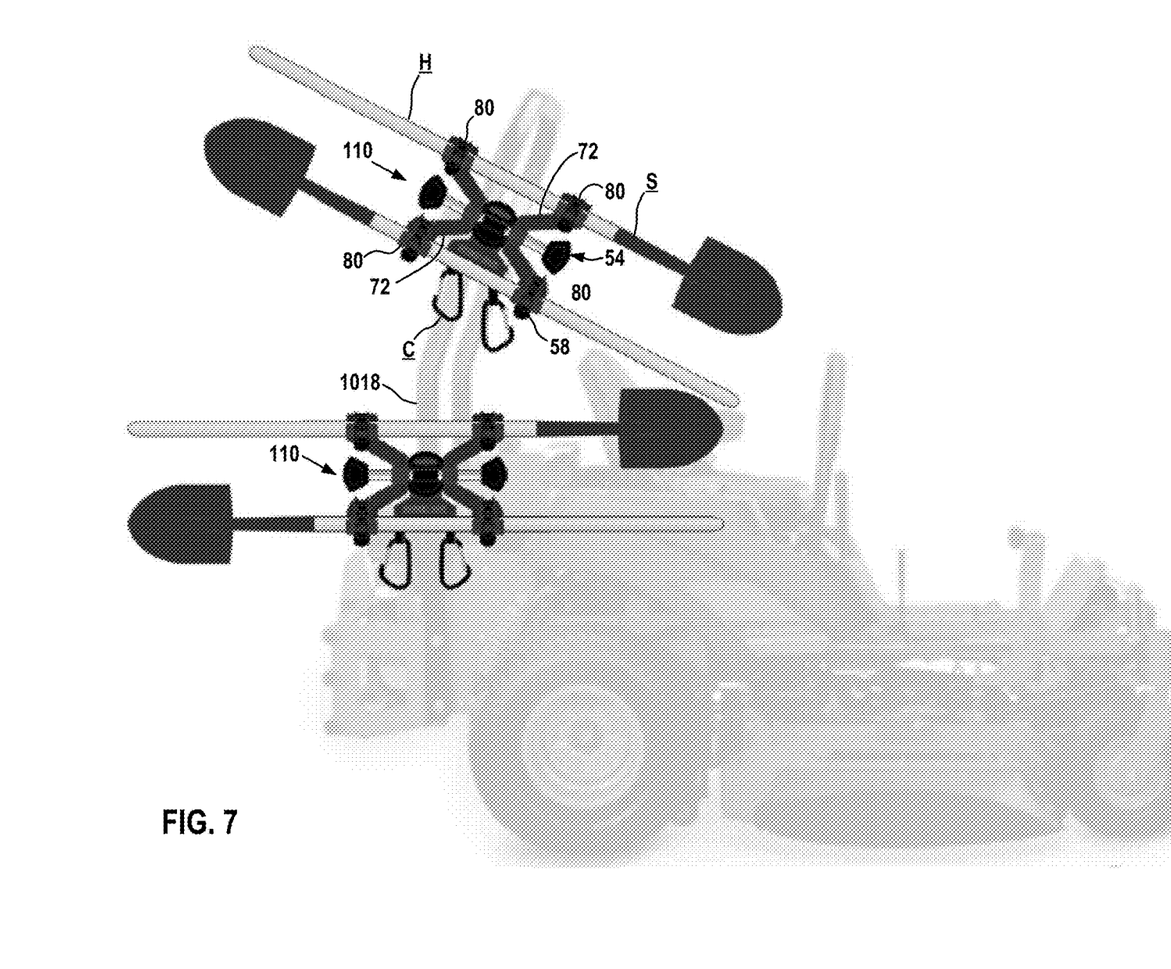
FIG. 7 illustrates a pair of the second embodiment tool holder apparatus attached to a ROPS of a motorized vehicle, the tool holding apparatus holding shovels.

FIG. 7 illustrates a pair of tool holder assemblies 110 attached to a ROPS member 1018 of a residential tractor. The holder members 72 of the tool holders 54 each carry a pair of shovels S having portions of the handle shafts H received in the tool retainers 80. Straps 58 attached to the tool retainers prevent the handles from falling out of the holder members. The axial offset between the upper and lower arms of the holder members 72 enables the shovels to be carried without the shovel blades interfering with one another.

The optimum angular orientation of a tool holder 54 with respect to the ROPS may be established by the user before transporting the tools. The angular positions of the tool holders 54 on the rotary tables can be modified if needed to prevent tools held on adjacent holders from interfering with one another.

If the ROPS is folded with the shovels still in the tool holder, the angular orientation of the tool holder can be changed before, during, or after folding without removing the tool holder apparatus 110 from the ROPS. The tool holder 54 can then be rotated back to its original position when the ROPS is raised.

Each tool holder apparatus 110 shown in FIG. 7 has carabiners C attached to the slots of the rotary table extension plate. The carabiners can remain attached to the tool holder apparatus without interfering with the tool retainers 80 or placing tools in or taking tools from the tool retainers 80.

Figure 8:
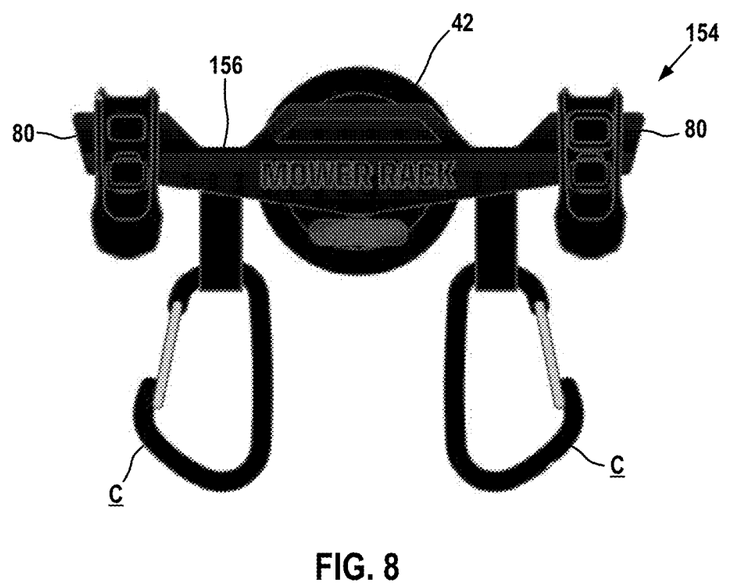
FIG. 8 is a front view of a third embodiment tool holder for a tool holder apparatus.

FIG. 8 illustrates a third embodiment tool holder 154 attached to the rotary table member 42. This embodiment tool holder is designed to hold a single spade, rake, or other long handled tool. The tool holder has a pair of tool retainers 80 as described above that are located on opposite ends of an arm 156. The tool retainers are axially offset away from the arm 156 to provide clearance for the tool handle. Slots (similar to the slots 94 shown in FIG. 4) in the arm 156 enable the tool holder to carry accessories such as the carabiners C.

Figure 9:
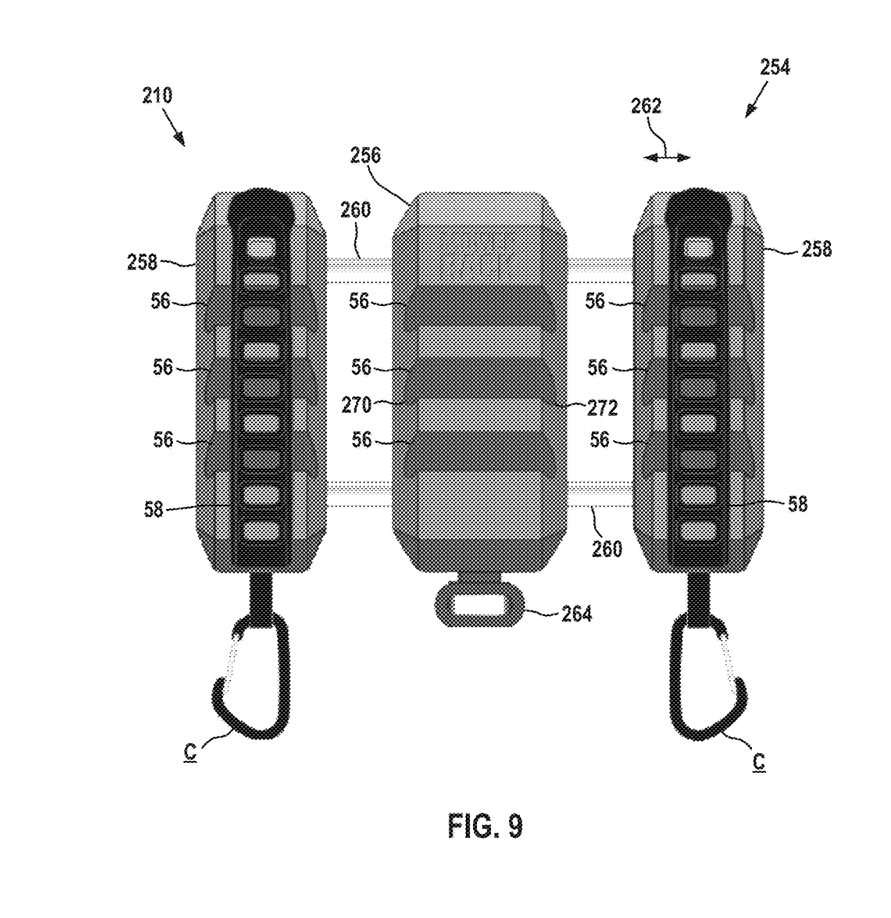
FIGS. 9 and 10 are front and left-side views of a third embodiment tool holder apparatus having a fourth embodiment tool holder.
Figure 10:
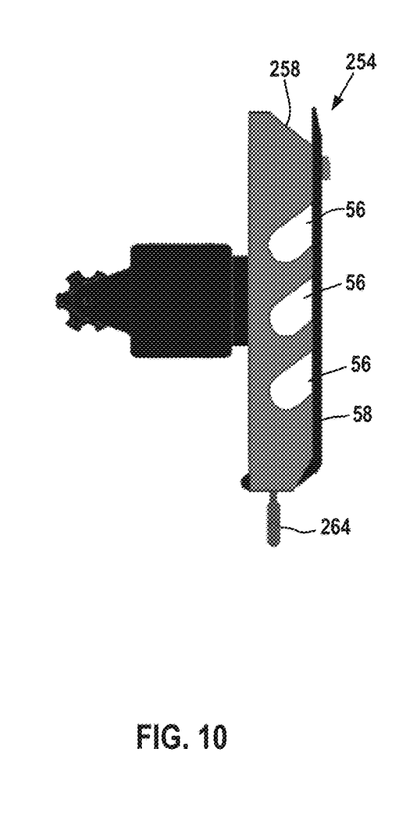

FIGS. 9 and 10 illustrate a third embodiment tool holder apparatus 210 having a tool holder 254. The tool holder includes a main base 256 attached to the outer table member, and a pair of like auxiliary bases 258 located on opposite sides of the base 256. A pair of parallel shafts 260 extend through the main base 256. The auxiliary bases are attached to the ends of the shafts. The shafts are slidingly received in the main base and enable the auxiliary bases to slide together axially to the left or right with respect to the main base 256 as viewed in FIG. 9 and as indicated by the double-ended arrow 262.

A handle 264 located at the bottom side of the main base 256 engages a friction member (not shown) against the lower shaft to lock and fix the main base with respect to the shafts and the auxiliary bases.

Each auxiliary base 258 includes a slot disposed at the bottom side of the base for holding an accessory such as a carabiner C as shown in FIG. 9.

Each base 256, 258 further includes a set of two or more like apertures 56 disposed on the outer surface of the base. The apertures are formed as spaced apart parallel grooves or slots that extend parallel with the shafts 260 between axially opposite open ends 270, 272. The axes of the apertures 56 in each base are not coaxial with one another, but are aligned with and are coaxial with the corresponding apertures in the other bases to cooperatively receive handle portions of long-handled tools. A strap 58 is attached to each auxiliary base 258 and covers the apertures to retain handle portions held in the apertures.

Figure 11:
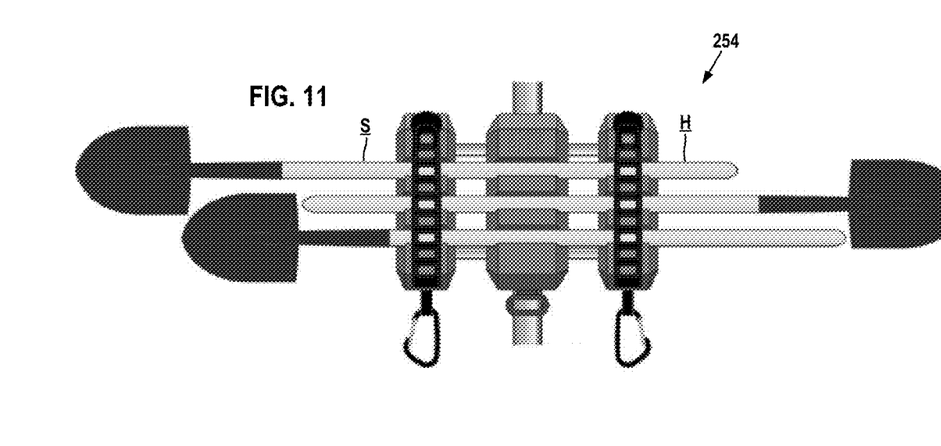
FIGS. 11 and 12 are similar to FIGS. 9 and 10 but illustrate the tool holder apparatus attached to a member of a motorized vehicle ROPS, the tool holder apparatus holding shovels.
Figure 12:
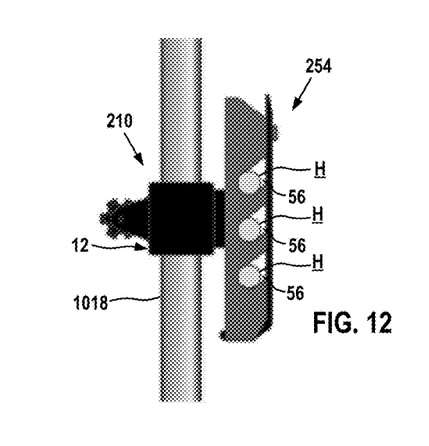

FIGS. 11 and 12 illustrate the tool holder apparatus 210 attached to a ROPS member 1018, the tool holder 254 holding three spades S. Each of the elongate shafts H of the spades are received in corresponding sets of parallel apertures 56 of the bases. FIG. 11 also illustrates the carabiners attached to the auxiliary bases.

The ROPS member 1018 shown in FIGS. 11 and 12 has a circular cross section. The attachment member 12 of the tool holder assembly 210 is configured for attaching to a circular ROPS member.

Figure 13:
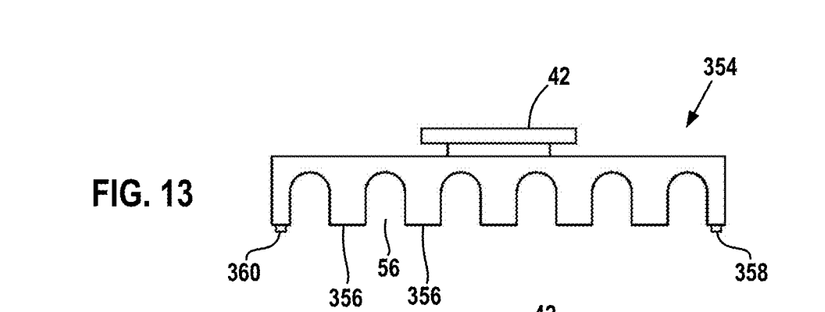
FIGS. 13 and 14 are top and front views of a fifth embodiment tool holder for a tool holder apparatus.
Figure 14:
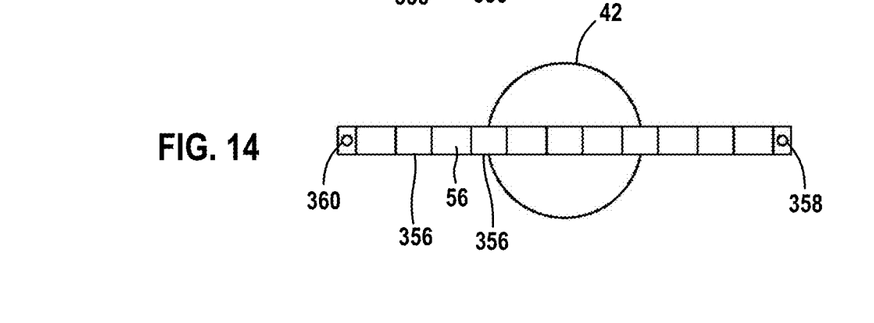

FIGS. 13 and 14 illustrate a fourth embodiment tool holder 354 for a tool holder apparatus. The tool holder is shown attached to the second table member 42 of the rotary table. The tool holder 354 is intended to hold a number of hand-held garden tools such as cultivators, hand spades, and the like. The tool holder 354 includes a number of apertures 56 defined by spaced apart fingers 356 that extend parallel with the axis of rotation of the rotary table. The width of the apertures between adjacent fingers is sized to receive the handle of the tool into the aperture while a head or body of the tool rests on top of the fingers. Strap posts 358 and 360 disposed on the outer pair of fingers enable a strap to close the front of the apertures.

Figure 15:
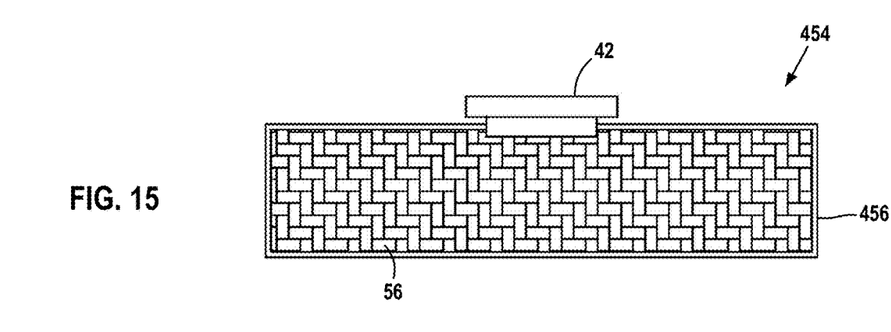
FIGS. 15 and 16 are top and front views of a sixth embodiment tool holder for a tool holder apparatus.
Figure 16:
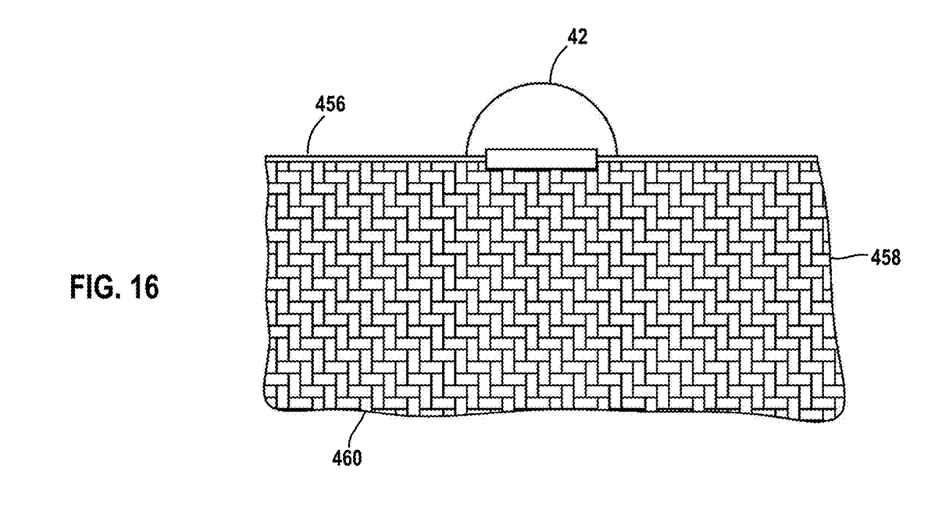

FIGS. 15 and 16 illustrate a fifth embodiment tool holder 454 for a tool holder apparatus. The tool holder 454 is shown attached to the second table member 42 of the rotary table. The tool holder 454 includes a frame 456 defining a rectangular aperture 56 and a tubular body attached to the frame and surrounding the aperture, the body extending away from the aperture to a closed end.

In the illustrated embodiment the body is formed as a fabric basket 458 attached to the frame that extends downwardly away from the frame to a closed basket end 460. The basket 458 can hold hand tools, accessories, spray cans, seed packets, and other odds and ends. The fabric weave allows moisture and the like to escape from the basket. A top flap (not shown) can be provided to close the top of the basket during transport. In other possible embodiments the basket may be formed as a rigid case or box made of plastic or other suitable rigid material. The frame and body may be formed as a single integral body.

Figure 17:
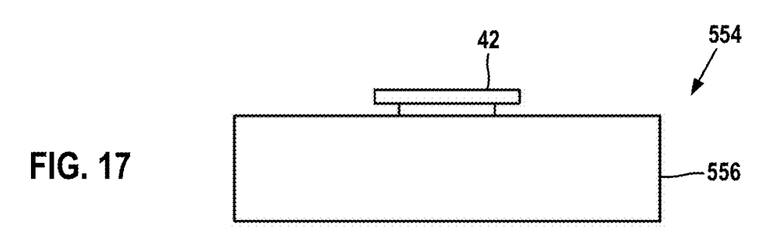
FIGS. 17 and 18 are top and front views of a seventh-embodiment tool holder for a tool holder apparatus.
Figure 18:
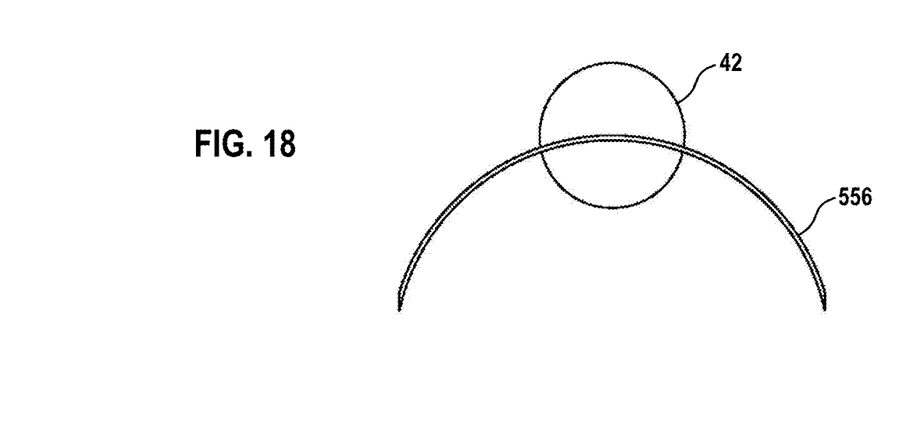

FIGS. 17 and 18 illustrate a sixth embodiment tool holder 554 for a tool holder apparatus. The tool holder 554 is shown attached to the outer table member 42 of the rotary table. The tool holder 554 includes a hose reel 556 configured for holding a garden hose. A garden hose may be secured to the hose reel for transport by an elastic bungee cord or the like, or the tool holder may be equipped with a strap (not shown) for securing the garden hose.

Embodiments of the tool holding apparatus disclosed herein may have attachment members designed to attach the tooth holding apparatus to structural members of a cage-type ROPS. The attachment members in alternative embodiments may be designed to attach the tool holder apparatus to another member of the motorized vehicle instead of or in addition to a ROPS member. The motorized vehicle may have a member dedicated for holding a tool holding apparatus.

Known holder designs for garden tools, hand tools, garden hoses, pruning shears, and the like can be modified to be incorporated for use in variant embodiments of tool holders for the disclosed tool holder apparatus.

While one or more embodiments have been disclosed and described in detail, it is understood that this is capable of modification and that the scope of the disclosure is not limited to the precise details set forth but includes modifications obvious to a person of ordinary skill in possession of this disclosure, including (but not limited to) changes in material selection, size, operating ranges (temperature, volume, displacement, stroke length, concentration, and the like), environment of use, and also such changes and alterations as fall within the purview of the following claims.

What is claimed is:

1. A motorized vehicle comprising:
    an operator's seat, a frame, a rollover protection system (ROPS), and a tool holder apparatus;
    the seat and the ROPS each being attached to the frame;
    the tool holder apparatus being attached to the ROPS, the tool holder apparatus comprising:
        an attachment member, a rotary table attached to the attachment member, and a tool holder attached to the rotary table;
        the attachment member receiving and engaging a member of the ROPS;
        the rotary table comprising a first member and a second member rotatably attached to the first member, the first member being attached to the attachment member, the second member being rotatable with respect to the first member about an axis of rotation;
        the tool holder comprising a shaft and a pair of holder members, the shaft extending along a first longitudinal axis, the shaft being fastened to the second member and rotating conjointly with the second member with respect to the first member with rotation of the second member relative to the first member about the axis of rotation, each holder member being mounted on the shaft and movable along the first longitudinal axis whereby the position of each holder member and the distance between the pair of holder members can be selectively established by a user;

each holder member comprising an upper tool retainer and a lower tool retainer spaced away from the upper tool retainer, each of the upper tool retainer and the lower tool retainer defining a respective aperture for receiving a tool held by the tool retainer; and the upper tool retainers of the pair of holder members defining and being coaxially aligned with one another along a second longitudinal axis spaced from the shaft, and the lower tool retainers of the pair of holder members defining and being coaxially aligned with one another along a third longitudinal axis spaced from the second longitudinal axis and spaced from the shaft.

2. The motorized vehicle of claim 1 wherein the first longitudinal axis is parallel with both of the second longitudinal axis and the third longitudinal axis.

3. The motorized vehicle of claim 1 wherein each holder member comprises an upper arm extending away from the shaft to the upper tool retainer and a lower arm extending away from the shaft to the lower tool retainer, each arm extending away from the shaft and away from the other arm in a direction perpendicular to the first axis.

4. The motorized vehicle of claim 3 wherein the arms of each holder member extend away from one another in a direction perpendicular to the axis of rotation.

5. The motorized vehicle of claim 1 wherein each holder member comprises a tubular sleeve that mounts the holder member onto the shaft.

6. The motorized vehicle of claim 5 wherein each holder member comprises an upper arm extending from the sleeve to the upper tool retainer and a lower arm extending from the sleeve to the lower tool retainer, the upper and lower arms each extending from the sleeve and away from the rotary table.

7. The motorized vehicle of claim 1 wherein the shaft comprises opposite shaft portions extending away from opposite sides of the rotary table.

8. The motorized vehicle of claim 1 wherein the tool holder comprises stops attached to respective ends of the shaft, each stop being in the path of movement of at least one of the holder members and sized to obstruct and resist movement of the at least one holder member past the stop.

9. The motorized vehicle of claim 1 wherein the rotary table comprises a brake that releasably holds the first and second members against one another to resist rotation of the second member with respect to the first member.

10. The motorized vehicle of claim 1 wherein the first longitudinal axis and the second longitudinal axis define a plane, and the lower tool retainers of the pair of holder members are spaced away from the plane whereby the third longitudinal axis is also spaced away from the plane.

11. The motorized vehicle of claim 1 wherein each tool retainer comprises a strap selectively positionable in opened and closed positions, the strap being disposed to cover the aperture of the tool retainer when in the closed position and away from the aperture when in the opened position.

12. The motorized vehicle of claim 1 wherein the first member of the rotary table comprises an extension plate extending from a side of the first member and comprising an extended portion being disposed beyond the second member of the rotary table, one or more through slots disposed in the extended portion of the extension plate.

13. The motorized vehicle of claim 1 wherein the ROPS comprises a fixed portion fixedly attached to the frame and a movable portion selectively movable with respect to the fixed portion, the attachment member of the tool holder apparatus being attached to the movable portion of the ROPS.

14. The motorized vehicle of claim 1 wherein the tool holder apparatus comprises a base centered on the second member of the rotary table for conjoint rotation with the second member relative to the first member; and the shaft being releasably fastened to the base whereby the axial position of the shaft with respect to the base can be selectively adjusted by a user.

15. A tool holder apparatus for transporting tools using a motorized vehicle having a rollover protection system (ROPS) member, the tool holder comprising:

an attachment member being configured to attach to the ROPS member, the attachment member being disposed on a first end of the tool holder apparatus, a tool holder being disposed on a second end of the tool holder apparatus, and a rotary table being disposed between the attachment member and the tool holder;

the rotary table comprising a first member and a second member rotatably attached to the first member, the first member being attached to the attachment member, the second member being rotatable with respect to the first member about an axis of rotation;

the tool holder comprising a shaft and a pair of holder members, the shaft extending along a first longitudinal axis, the shaft being fastened to the second member and rotating conjointly with the second member with respect to the first member with rotation of the second member relative to the first member about the axis of rotation, each holder member being mounted on the shaft and movable along the first longitudinal axis whereby the position of each holder member and the distance between the pair of holder members can be selectively established by a user;

each holder member comprising an upper tool retainer and a lower tool retainer spaced away from the upper tool retainer, each of the upper tool retainer and the lower tool retainer defining a respective aperture for receiving a tool held by the tool retainer; and the upper tool retainers of the pair of holder members defining and being coaxially aligned with one another along a second longitudinal axis spaced from the shaft, and the lower tool retainers of the pair of holder members defining and being coaxially aligned with one another along a third longitudinal axis spaced from the second longitudinal axis and spaced from the shaft.

16. The tool holder apparatus of claim 15 wherein the first longitudinal axis is parallel with both of the second longitudinal axis and the third longitudinal axis.

17. The tool holder apparatus of claim 15 wherein each holder member comprises an upper arm extending away from the shaft to the upper tool retainer and a lower arm extending away from the shaft to the lower tool retainer, each arm extending away from the shaft and away from the other arm in a direction perpendicular to the first axis.

18. The tool holder apparatus of claim 17 wherein the arms of each holder member extend away from one another in a direction perpendicular to the axis of rotation.

19. The tool holder apparatus of claim 15 wherein each holder member comprises a tubular sleeve that mounts the holder member onto the shaft.

20. The tool holder apparatus of claim 19 wherein the sleeve and the shaft cooperatively define a nonrotatable connection between the sleeve and the shaft.

21. The tool holder apparatus of claim 19 wherein each holder member comprises an upper arm extending from the sleeve to the upper tool retainer and a lower arm extending from the sleeve to the lower tool retainer, the upper and lower arms each extending from the sleeve and away from the rotary table.

22. The tool holder apparatus of claim 15 wherein the shaft comprises opposite shaft portions extending away from opposite sides of the rotary table.

23. The tool holder apparatus of claim 22 wherein the tool holder comprises stops attached to respective ends of the shaft, each stop being in the path of movement of at least one of the holder members and sized to resist and obstruct movement of the at least one holder member past the stop.

24. The tool holder apparatus of claim 23 wherein each stop is removably fastened to the shaft.

25. The tool holder apparatus of claim 15 wherein the rotary table comprises a brake that releasably holds the first and second members against one another to resist rotation of the second member with respect to the first member.

26. The tool holder apparatus of claim 15 wherein the first longitudinal axis and the second longitudinal axis define a plane, and the lower tool retainers of the pair of holder members are spaced away from the plane whereby the third longitudinal axis is also spaced away from the plane.

27. The tool holder apparatus of claim 26 wherein the third longitudinal axis is spaced away from the plane in a direction parallel with the axis of rotation.

28. The tool holder apparatus of claim 15 wherein each tool retainer comprises a strap selectively positionable in opened and closed positions, the strap being disposed to cover the aperture of the tool retainer when in the closed position and away from the aperture when in the opened position.

29. The tool holder apparatus of claim 15 wherein the first member of the rotary table comprises an extension plate extending from a side of the first member and comprising an extended portion being disposed beyond the second member of the rotary table, one or more through slots disposed in the extended portion of the extension plate.

30. The tool holder apparatus of claim 15 wherein the tool holder apparatus comprises a base centered on the second member of the rotary table for conjoint rotation with the second member relative to the first member; and the shaft being releasably fastened to the base whereby the axial position of the shaft with respect to the base can be selectively adjusted by a user.

31. The tool holder apparatus of claim 30 wherein the tool holder apparatus comprises an extension plate extending from a side of the base and spaced from the second member of the rotary table, the extension plate comprising one or more through holes.

32. The tool holder apparatus of claim 31 comprising a respective clip disposed in each of the one or more through holes.

33. The tool holder apparatus of claim 15 wherein the first member of the rotary table comprises an extension plate extending from a side of the first member and comprising an extended portion being disposed beyond the second member of the rotary table, one or more through slots being disposed in the extended portion of the extension plate.

* * * * *